United States Patent [19]

Epstein et al.

[11] Patent Number: 5,608,550
[45] Date of Patent: Mar. 4, 1997

[54] FRONT-LIT LIQUID CRYSTAL DISPLAY HAVING BRIGHTNESS ENHANCING FILM WITH MICRORIDGES WHICH DIRECTS LIGHT THROUGH THE DISPLAY TO A REFLECTOR

[75] Inventors: Kenneth A. Epstein, St. Paul; Robert P. Wenz, Woodbury, both of Minn.

[73] Assignee: Minnesota Mining and Manufacturing Company, St. Paul, Minn.

[21] Appl. No.: 578,884

[22] Filed: Jan. 17, 1996

Related U.S. Application Data

[63] Continuation of Ser. No. 265,230, Jun. 24, 1994, abandoned.

[51] Int. Cl.$^6$ .................. G02F 1/1335; G02B 27/10; G02B 6/34
[52] U.S. Cl. .................. 359/40; 359/49; 359/625; 385/36
[58] Field of Search .................. 359/40, 42, 48, 359/49, 50, 69, 599, 613, 625; 362/26, 31; 385/36

[56] References Cited

U.S. PATENT DOCUMENTS

| | | | |
|---|---|---|---|
| 3,752,974 | 8/1973 | Baker et al. | 362/31 |
| 4,011,001 | 3/1977 | Moriya | 359/49 |
| 4,017,155 | 4/1977 | Yagi et al. | 359/49 |
| 4,252,416 | 2/1981 | Jaccard | 359/49 |
| 4,282,560 | 8/1981 | Kringel et al. | 362/26 |
| 4,573,766 | 3/1986 | Bournay, Jr. et al. | 359/48 |
| 4,737,896 | 4/1988 | Mochizuki et al. | 362/301 |
| 4,798,448 | 1/1989 | van Raalte | 359/41 |
| 4,799,137 | 1/1989 | Aho | 362/309 |
| 4,822,145 | 4/1989 | Staelin | 359/40 |
| 4,874,228 | 10/1989 | Aho et al. | 359/49 |
| 4,896,953 | 1/1990 | Cobb, Jr. | 359/710 |
| 4,929,062 | 5/1990 | Guzik et al. | 359/48 |
| 4,975,808 | 12/1990 | Bond et al. | 362/31 |
| 4,989,125 | 1/1991 | Cobb, Jr. et al. | 362/346 |
| 5,005,108 | 4/1991 | Pristash et al. | 362/31 |
| 5,029,060 | 7/1991 | Aho et al. | 362/299 |
| 5,040,878 | 8/1991 | Eichenlaub | 359/49 |
| 5,040,883 | 8/1991 | Cobb, Jr. | 359/742 |
| 5,070,431 | 12/1991 | Kitazawa et al. | 362/31 |
| 5,136,479 | 8/1992 | Ruffner | 362/29 |
| 5,190,370 | 3/1993 | Miller et al. | 362/340 |
| 5,477,239 | 12/1995 | Busch et al. | 345/102 |

FOREIGN PATENT DOCUMENTS

| | | | |
|---|---|---|---|
| 2655-166 | 5/1978 | Germany | 359/48 |
| 60-107618 | 6/1985 | Japan . | |
| 2246231 | 1/1992 | United Kingdom . | |

*Primary Examiner*—William L. Sikes
*Assistant Examiner*—Walter J. Malinowski
*Attorney, Agent, or Firm*—Gary L. Griswold; Walter N. Kirn; H. Sanders Gwin, Jr.

[57] ABSTRACT

A front-lit display, having a ridged transparent film thereon. The ridges on the film bend glancing light rays down into the display. The light rays are reflected by a reflector below the display, pass back through the display, and exit the film in a direction substantially normal to the display. Thus, the ridged film enhances the brightness of the display for a given light source.

20 Claims, 6 Drawing Sheets

FRONT-LIT LIQUID CRYSTAL DISPLAY HAVING BRIGHTNESS ENHANCING FILM WITH MICRORIDGES WHICH DIRECTS LIGHT THROUGH THE DISPLAY TO A REFLECTOR

This is a continuation of application No. 08/265,230, filed Jun. 24, 1994, now abandoned.

FIELD OF THE INVENTION

The present invention relates generally to the field of enhancing the brightness of displays, and more particularly to enhancing the brightness of front-lit liquid crystal displays.

BACKGROUND OF THE INVENTION

Displays such as billboards, mall displays, and pixellated displays, e.g., liquid crystal displays, are typically illuminated for viewing either from the rear of the display, i.e., "backlit," or from the front of the display using either ambient lighting or side lighting. When front lighting, also known as sidelighting, is used, a light source is provided at one or both sides of the display and is raised slightly above the plane of the display to allow the light to be directed down onto the display. However, because the height of the light source over the plane of the display is usually small compared with the length of the display, light rays from the light source strike the display at an angle of incidence approaching 90° (i.e., tangent to the surface). As a result, most of the light is lost via glancing angle reflection at the display surface and is not available to the viewer.

SUMMARY OF THE INVENTION

The present invention solves this problem by providing a film on the display designed to maximize the light transmitted to the display, thereby increasing the amount of light available to the viewer. The present invention includes a flat display, such as a liquid crystal display, a transparent film on the display, a reflector on the opposite side of the display, and a light source. The film has many tiny ridges on the side opposite the display. Light rays are directed toward the film at a glancing angle and are bent toward the display by the ridges. The light rays travel through the display once, are reflected by the reflector back through the display a second time, exit the film, and proceed toward the viewer at angles ranging from 0° to ±30° to the normal of the display.

The pitch of the ridges is preferably greater than one ridge per pixel. In one embodiment, the ridges have angles α and β of 70° to 90° and 40° to 50°, respectively, and are separated by a face parallel to the display, as shown in FIG. 2. In another embodiment, the ridges are separated by a face that is tilted at an angle δ within the range of about 1° to 3° with respect to the display, as shown in FIG. 6. In yet another embodiment, angle α is from 5° to 20° and angle β is from 60° to 90°, and the ridges are immediately adjacent each other, as shown in FIG. 5. In still yet another embodiment, a groove is provided adjacent each ridge on the side of the ridge opposite the light source, as shown in FIG. 7.

The light source may be comprised of a point light source, such as a light emitting diode, and a light pipe for converting the point source into a line source. The light pipe may have a rectangular cross-section and have notches on the side of the pipe opposite the display. In the alternative, the pipe may have steps on the side opposite the display that gradually decrease the thickness of the pipe as one moves along the pipe away from the light source.

DETAILED DESCRIPTION

Figure 1:
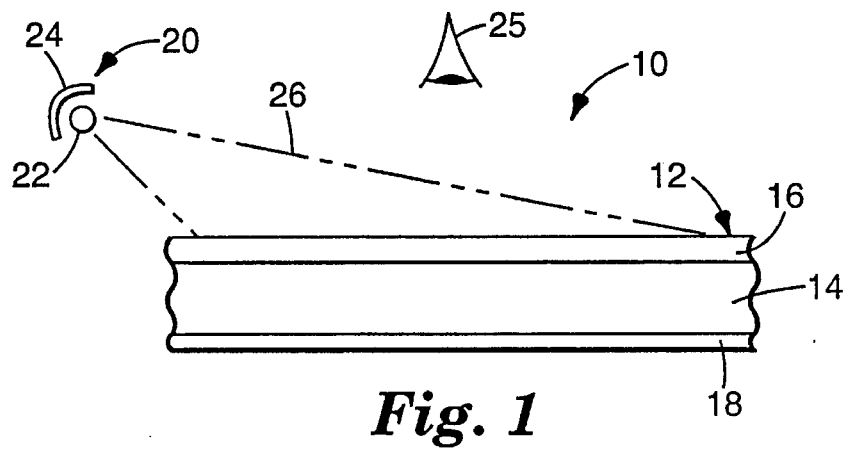
FIG. 1 shows a schematic side view of a front lighting system according to one embodiment of the present invention.

A front lighting system according to the present invention is shown in FIG. 1. System 10 is comprised of display panel 12 and light source 20. Display panel 12 is comprised of display 14, grazing incidence refracting film 16 on the side of the display that faces a viewer 25, and reflector 18, e.g., a diffuse reflector, on the opposite side of the display. Display 14 may be any display, including a pixellater display such as a liquid crystal display. Light source 20 is comprised of light tube 22 and optional reflector 24. As shown in FIG. 1, light source 20 provides a light beam 26 which illuminates the front of display panel 12.

Figure 2:
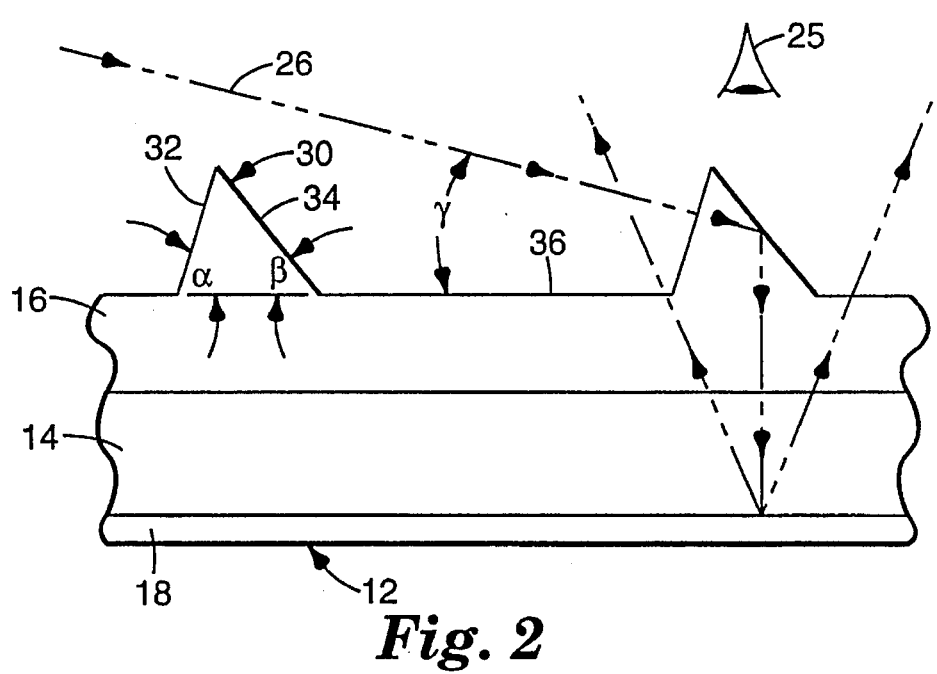
FIG. 2 shows a schematic side view of a grazing incidence refracting film according to one embodiment of the present invention.

A close-up schematic side view of film 16 is shown in FIG. 2. Film 16 is comprised of ridges 30 having first and second faces 32 and 34. Ridges 30 are separated by face 36 which is, but need not be, parallel to the bottom of film 16. The shape of ridges 30 is determined by angles α and β. Light rays 26 are incident on display panel 12 (and thus on film 16) at a glancing angle γ, e.g., 2°. Light rays 26 enter a face 32 of ridge 30 at or near normal incidence. Light rays 26 continue through ridge 30, are reflected at face 34 by total internal reflection, and continue down through film 16 in a direction approximately normal to display panel 12. Light rays 26 pass through display 14 to back reflector 18, where the rays are reflected and diffused back through display 14. Light rays 26 exit display panel 12 via face 36 and proceed toward viewer 25 at angles ranging from 0° to ±30° to the normal of display panel 12.

The height and separation of ridges 30 is a function of the angle γ that light rays 26 from light source 20 strike display panel 12. Ridges 30 should not be so high or so close together that face 32 of one ridge prevents light rays 26 from reaching a face 32 of a neighboring ridge. For a liquid crystal display, ridges 30 are preferably less than 100 μm high, and more preferably within the range of from about 5 μm to 20 μm high, e.g., 9 μm. Angle α is preferably equal to about 90°–γ, i.e., within the range of from about 70° to 90° and more preferably from about 85° to 90°, e.g., 88°. For the angles oe above, angle β is preferably within the range from about 30° to the total internal reflection limit, e.g., 54° for γ=3° and a film 16 having an optical index of 1.6, and is more preferably within the range of about 40° to 50°, e.g., 45°. Angle γ is preferably within the range of from about 0° to 5°, e.g., 2°. The distance between the peaks of adjacent ridges 30 is preferably about 5 to 100 times the heights of the ridges, and preferably within the range of from about 10 to 20, and more preferably about 15.

In an alternative embodiment, a second light source (not shown) similar to light source 20 may be provided on the opposite end of display panel 12 so that light rays from the light sources strike ridges 30 from both directions. In this case, the shape of ridges 30 should be symmetrical so that α=β, e.g., =54°.

If display 14 is a pixellater display, e.g., a liquid crystal display, a pitch of one or more ridges per pixel ensures that the display can be viewed in its entirety. Reflector 18 can be white diffuse, brushed metal, or a particle/resin composite.

Film 16 is preferably a polymer sheet such as polycarbonate. Film 16 is preferably adhered to display 14 via lamination or by ultraviolet (UV) cure. Ridges 30 should cover only a small fraction of the surface area of display 14, i.e., preferably less than 20% and more preferably less than 10%. The majority of the surface of the display should be flat (i.e., face 36) to allow most of the light exiting the display to be undisturbed by the refracting surface structure.

Figure 3:
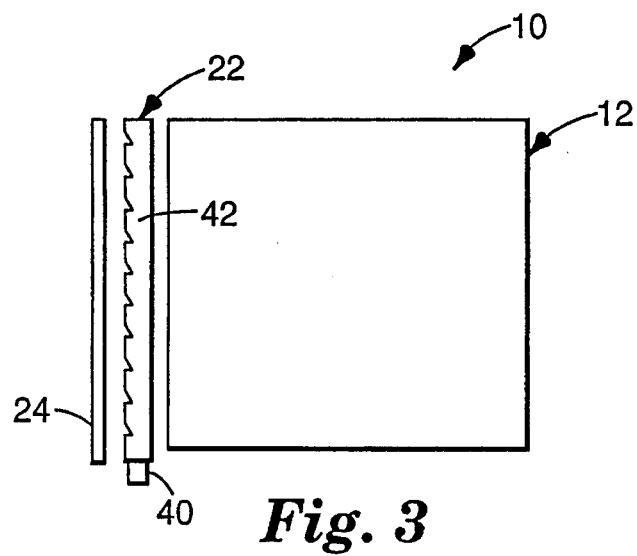
FIG. 3 shows a top schematic view of a front lighting system according to another embodiment of the present invention.

In one embodiment of the present invention, light tube 22 may be comprised of a line of point light sources with corresponding collimating microlenses, a cylindrical lens, or a linear lenticular lens. In another embodiment, a light tube 22 may be comprised of a point light source 40 and a light pipe 42, as shown in FIG. 3. Point light source 40 may be a light emitting diode (LED). LEDs typically have a narrow cone of light emission and operate efficiently in the range of from about 5 to 10 lumens/watt.

Light pipe 42 preferably has a rectangular, e.g., square, cross-section, which preserves the modes emitted from point light source 40, i.e., the cone of emission from light pipe 42 is about the same as that of the light source. This would not be true if light pipe 42 had non-parallel or curved surfaces.

Figure 4A:
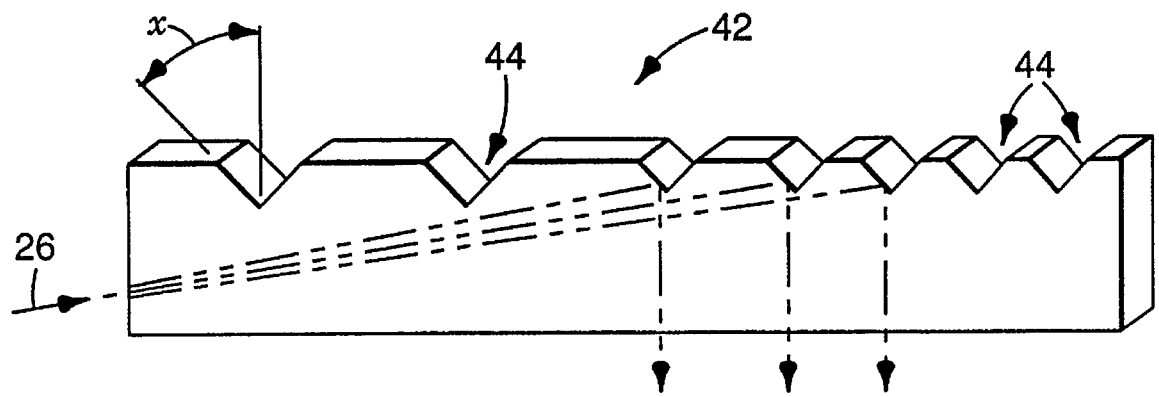
FIGS. 4A and 4B show schematic perspective views of alternative embodiments of a light pipe according to the present invention.
Figure 4B:
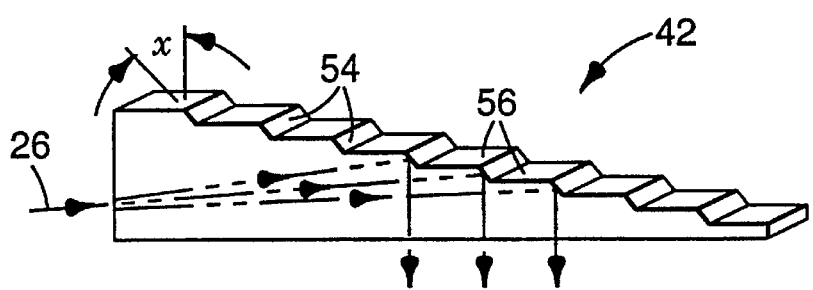

Alternative embodiments of light pipe 42 are shown in FIGS. 4A and 4B. In FIG. 4A, light pipe 42 has a plurality of notches 44 in the surface of the light pipe opposite the direction that light rays from point light source 40 will be directed by the light pipe, i.e., opposite the side of the light pipe adjacent display panel 12. Notches 44 preferably form an angle x of about 45°. The pitch, i.e., frequency, of notches 44 is preferably non-uniform to improve the uniformity of illumination from one end of light pipe 42 to the other. An increasing density of notches 44 compensates for the drop in luminous flux density as light is removed from light pipe 42 proceeding away from point light source 40. The pitch of notches 44 could be from about 5 to 100/cm.

An alternative embodiment of light pipe 42 is shown in FIG. 4B. In FIG. 4B, light pipe 42 is wedge-shaped and has a plurality of step-facets 54 which extract light from the pipe and direct it out the opposite side of the light pipe, as discussed above with respect to FIG. 4A. As in the case of FIG. 4A, the preferred angle x of step-facets 54 is about 45°. Faces 56 are preferably parallel to the opposite surface of light pipe 42, i.e., parallel to the length of step-facets 54, and are preferably uniform across the length of the light pipe to provide uniform illumination across the length of the light pipe.

Figure 5:
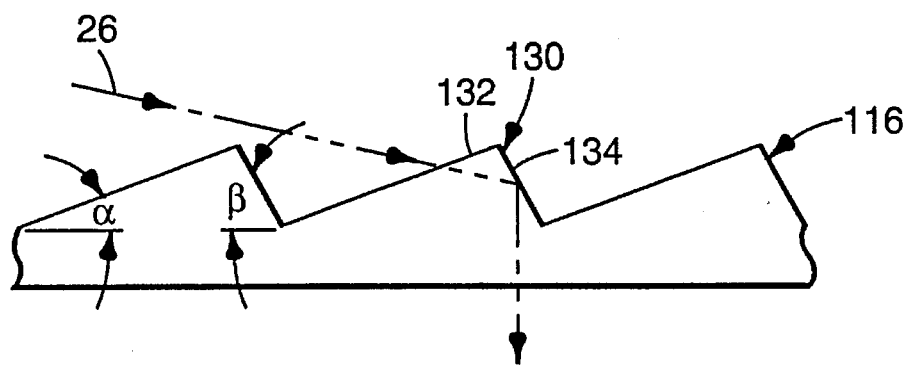
FIGS. 5–7 show schematic side views of alternative embodiments of a grazing incidence refracting film according to the present invention.
Figure 6:
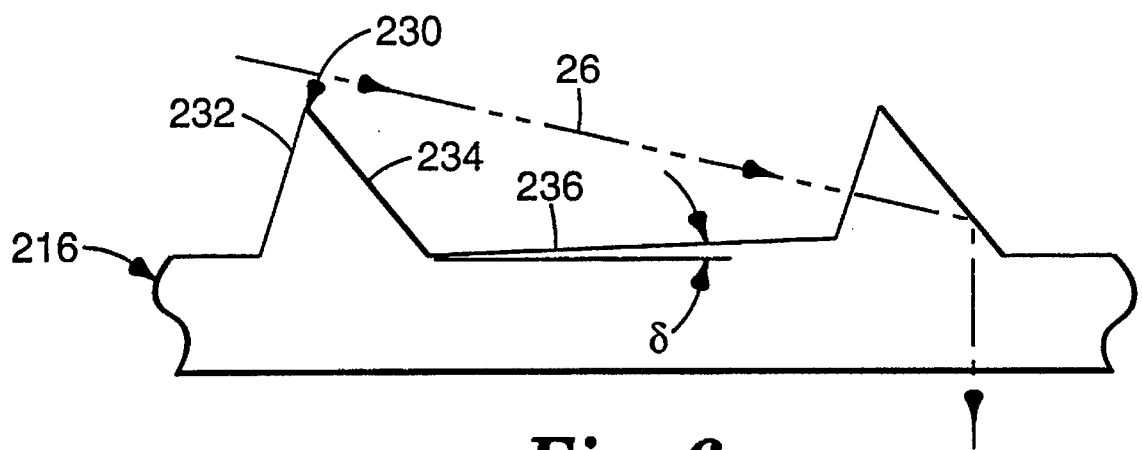
Figure 7:
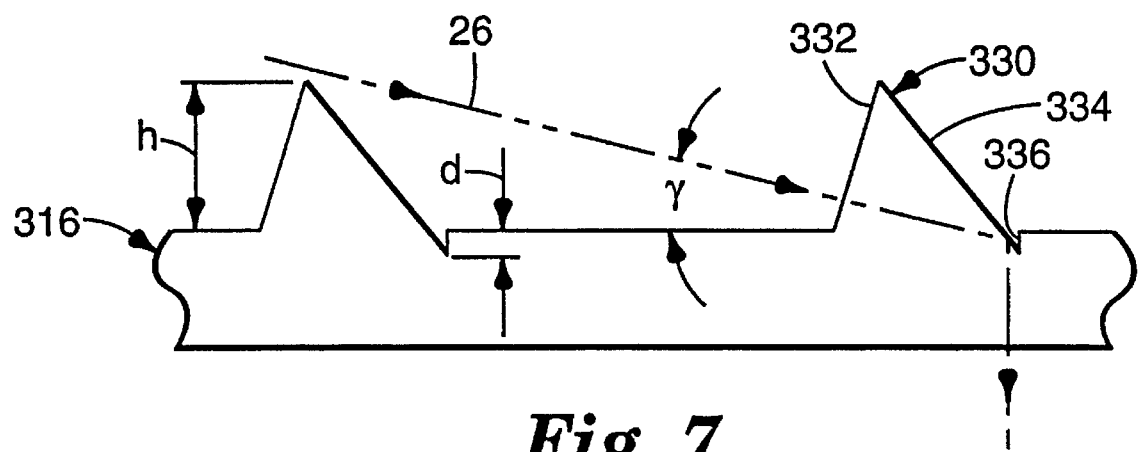

Alternative embodiments of film 16 are shown in FIGS. 5–7. FIG. 5 shows a film 116 having ridges 130, each having a gradual face 132 and a steep face 134. There is no face parallel to the bottom of film 116. However, the slope of faces 132 is so gradual that the refractive secondary image from face 134 is negligible.

Angle α is preferably within the range of from about 5° to 20°, with 5° being the lower limit for satisfactory transmission of glancing incidence rays, and 20° being the upper limit for high contrast viewing. Angle β is preferably within the range of from about 60° to 90°. The distance between peaks of adjacent ridges 130 is preferably about 3 to 10 times greater than the heights of the ridges. The design of film 116 allows for ease of manufacturing ridges 130 that are less fragile than ridges 30 in film 16.

The efficiency of face 34 in film 16 (FIG. 2) can be improved by either decreasing the size of face 32 or increasing the size of face 34, as illustrated by FIGS. 6 and 7, respectively. As shown in FIG. 6, film 216 resembles film 16 with the exception that unlike face 36 of film 16, face 236 of film 216 is not parallel with the back of the film. Film 2 16 has a plurality of ridges 230 having faces 232 and 234. Face 236 is inclined at an angle δ that is correlated with angle γ formed by the light rays from the light source. For $1°<γ<3°$, $1°<δ<3°$, approximately. Because face 236 is inclined at an angle δ, the size of face 232 is decreased. In an alternative embodiment of the present invention, angle δ is negatively correlated with angle γ so that for $1°<γ<3°$, $-1°>δ>-3°$.

As shown in FIG. 7, film 316 is comprised of ridges 330 having faces 332 and 334 and grooves 336 provided adjacent face 334. Assuming the use of light rays having an angle γ less than 6°, the depth d of grooves 336 should be at least about ⅕ that of the height h ridges 330. Grooves 336 allow for an increase in the size of face 334.

The invention will now be further described with respect to the following non-limiting Examples. All measurements are approximate.

EXAMPLE 1

A system 10 as shown in FIG. 1 having a film 16 as shown in FIG. 2 was modelled with a computer ray tracing program. Light source 20 (without optional reflector 24) was comprised of a 5 mm high light 22 which was aimed down toward display panel 12 at a 2° angle. Display panel 12 was 100 mm wide and pixels having a center-to-center separation of 300 μm. Ridges 30 were 9 μm high and had a peak-to-peak spacing of 100 μm. Angle α was 88° and angle β was 44°. The illumination of display panel 12 was simulated in two-dimensions (cross-section) by the optical rays from a line source 20 described by a series of twenty light beams (or fans) that extend along the side of the light source facing the display panel. Each fan, tilted at 2° to the horizontal (γ=2°), contained 400 rays evenly spread across its 8° span. Directly beneath display panel 12 was a measurement surface that collected the rays and discriminated the illuminance spatially into bins as a percentage of total light source emission.

Figure 8:
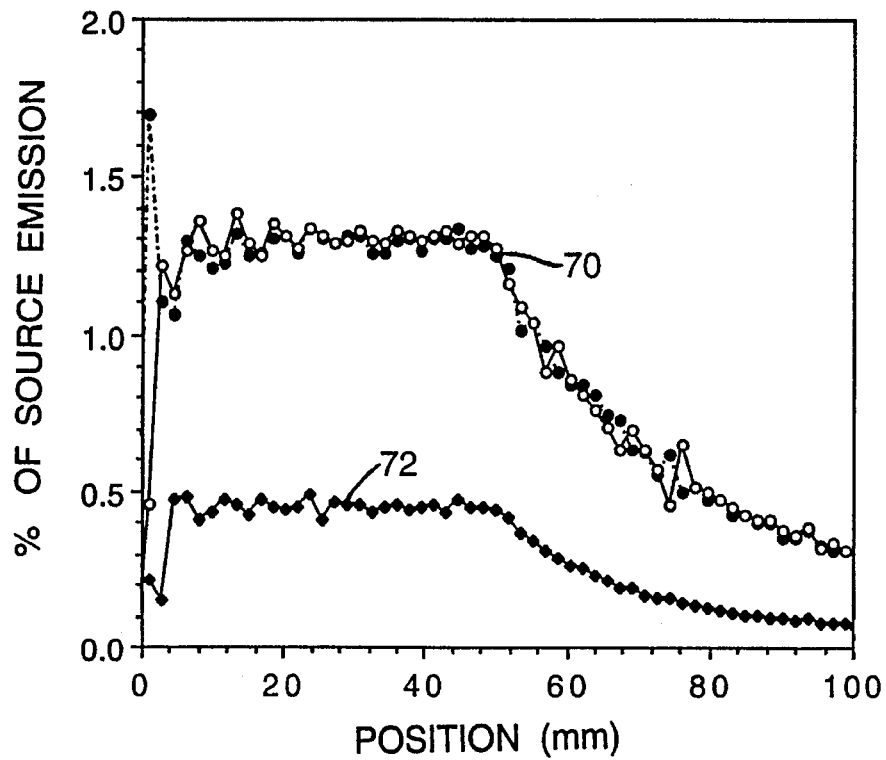
FIGS. 8–10 show computer modelled graphs of percentage source emission as a function of position across a display for various embodiments of the system shown in FIGS. 1 and 2.

The percentage of source emission was calculated as a function of position across the width of the display panel both with and without film 16. The results are shown in FIG. 8, where line 70 represents the illuminance with film 16 in place and line 72 represents the illuminance without the film in place. In line 70, the open circles represent the illuminance at the top of film 16 and the closed circles represent the illuminance directly below display 12. The fact that the open and closed circles form a single line 70 indicates that there is minimal reflection loss at the surface of film 16.

With the film 16 in place, 55% of the light from the light source reached the measurement surface, compared to only 18% without the film. However, qualitatively speaking, the viewer would see an even greater improvement than the three-fold enhancement here. This is true because the back reflector of a reflective liquid crystal display (LCD) is directionally diffuse (or diffusely specular), thus most of the light that is transmitted through a bare LCD surface is reflected by the back reflector at approximately the angle of incidence. It follows that most of the light returns through the LCD/air interface toward the right at a glancing angle and is not useful to a viewer. Therefore, the actual improvement is much greater than a factor of 3.

Figure 9:
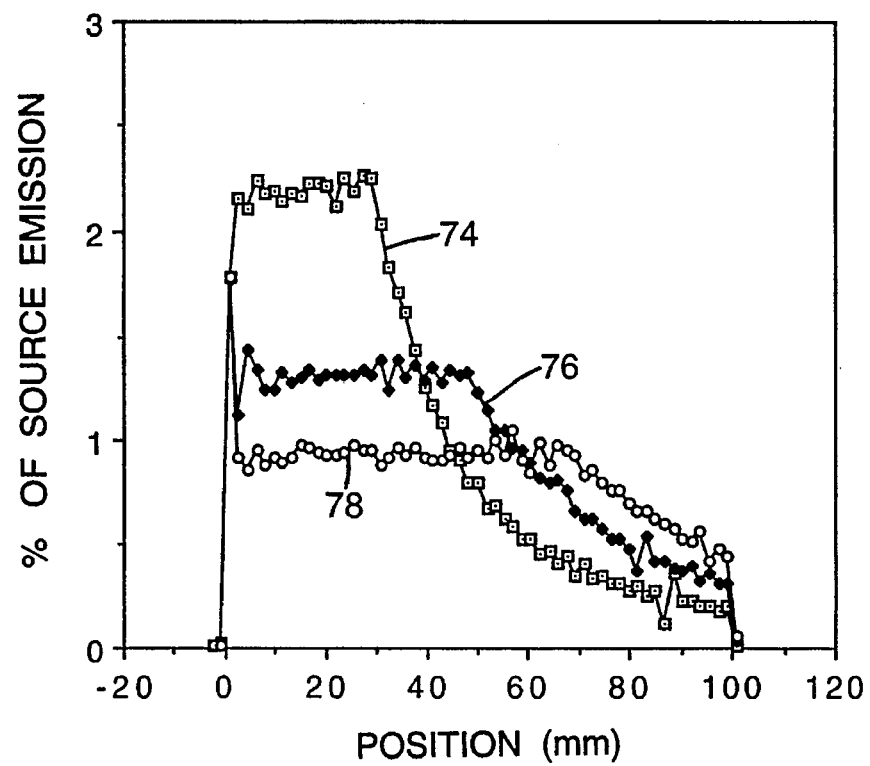

The dependence of illuminance on the height of light source 20 is shown in a computer modelled graph of FIG. 9. The total light on the LCD was measured for light source heights of 3, 5, and 7 mm to be 63%, 56%, and 49%, respectively. As the graph shows, the 3 mm light source (represented by line 74) gives greater brightness over portions of the display, but with poor uniformity across the width of the display. The 7 mm light source (represented by line 78) is less bright over the same portion of the display, but has greater uniformity across the width of the display. The 5 mm light source (represented by line 76) represented an intermediate case between these two extremes.

Figure 10:
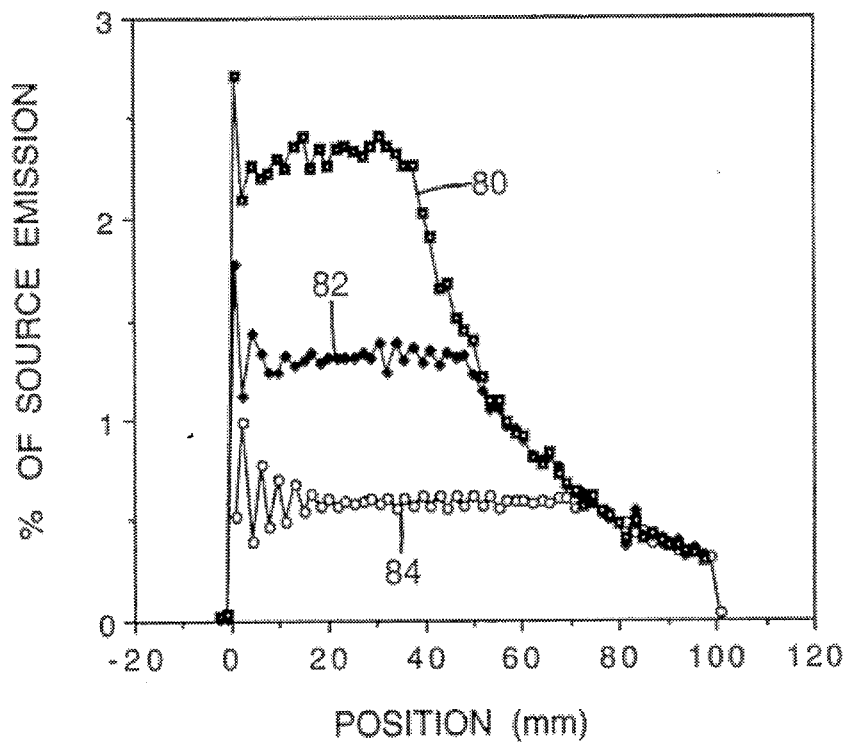

The dependence of illumination on the angle γ that light beam 26 strikes display panel 12 is shown in a computer-modelled graph in FIG. 10. The total light on the LCD was measured for a 5 mm light source and having angles γ of 0°, 2° and 4°. As the graph shows, light rays striking the LCD at an angle γ of 4° (represented by line 80) were brighter over a portion of the LCD, but were not uniform across the display. Light rays striking the LCD at 0° (represented by line 84) were less bright over that same portion, but were uniform across the width of the display. An angle γ of 2° (represented by line 82) represented an intermediate case between these two extremes.

EXAMPLE 2

Figure 11B:
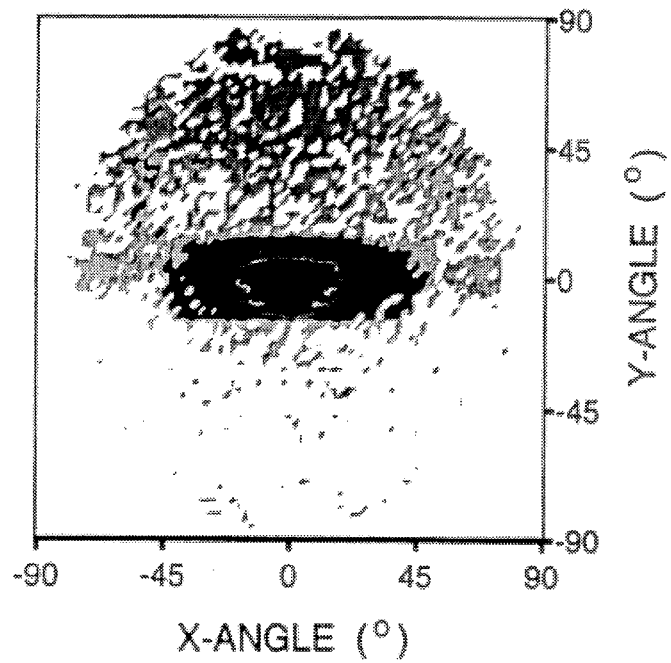
FIGS. 11A and 11B show computer modelled graphs of light emission from light pipes having square and circular cross-sections, respectively.
Figure 11A:
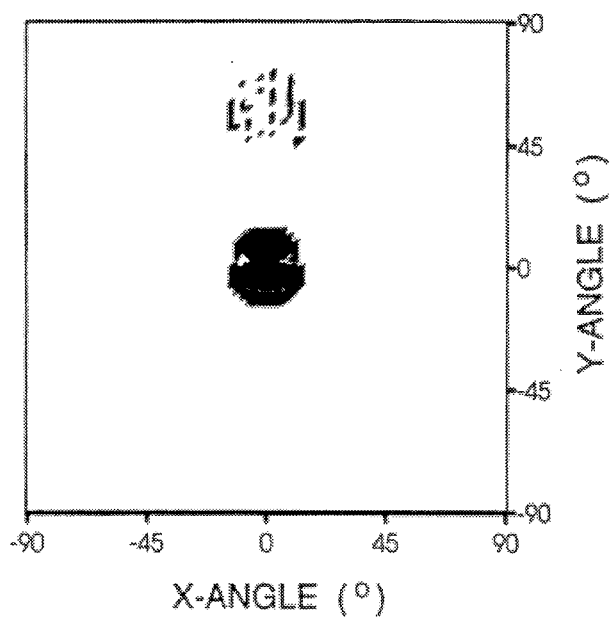

A light pipe similar to that shown in FIG. 4A having a square cross-section and V-shaped notches having an angle x of 45° was compared to a light pipe having similar notches and a circular cross-section via computer modelling. A line of optical ray cones, having a cone angle of $\Theta_{1/2}=14°$, was launched into the input aperture of the light pipes. FIGS. 11A and 11B show calculated emission patterns from the light pipes where the x-axis is the observation angle about the axis (length) of the light pipe and the y-axis is the observation angle along the length of the light pipe, i.e., substantially in the plane of the display.

The calculated emission pattern for a light pipe having a single notch and a square cross-section is shown in FIG. 11A. The calculated emission pattern for a light pipe having a single notch and a circular cross-section is shown in FIG. 11B. The density of the scatter plot corresponds to the intensity of light. The high density pattern in FIG. 11A (square cross-section) is approximately a cone having a cone $\Theta_{1/2}=14°$, while in FIG. 11B (circular cross-section) the light scatters to a much wider emission pattern. Thus, the square cross-section of the light pipe of the present invention preserves the modes emitted from the light source, i.e., the cone of emission from the light pipe is about the same as that from the light source.

EXAMPLE 3

Figure 12:
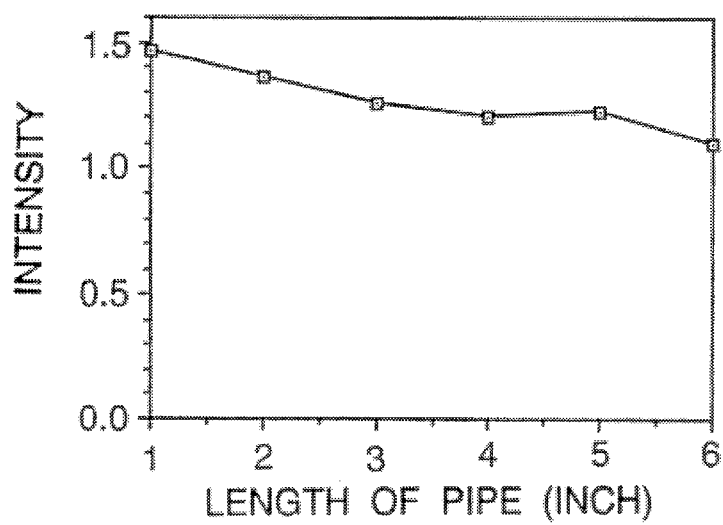
FIG. 12 shows a graph of light intensity as a function of position along the length of a light pipe according to one embodiment of the present invention.

A light pipe resembling that shown in FIG. 4B was constructed. The light pipe wedge formed an angle of 1.2° and had 6 μm wide step facets with a uniform pitch of 52/cm. It tapered from 4 mm by 4 mm at the input aperture to 4 mm by 0.6 mm at the distal end. An amber AlInGaP LED (Hewlett Packard part HLMP-CL00) was mechanically secured against the aperture of the light pipe. A silvered reflective film (EPC-300 Energy Control Products Division #300 "Silverlux", 3M Company, St. Paul, Minn.) was mechanically secured against the faceted side of the light pipe. The light intensity was measured at several positions along the length of the light pipe. The results, shown in FIG. 12, indicate that light intensity (measured in arbitrary units) was relatively uniform along the length of the light pipe.

We claim:

1. A front-lit display system, comprising:

a display comprised of a plurality of pixels having front and back major surfaces;

a transparent film having two major opposing surfaces, one smooth and the other having a plurality of parallel ridges, wherein the smooth surface is adjacent the front surface of the display, and wherein the ridges have a pitch greater than one ridge per pixel;

a reflector provided adjacent the back surface of the display; and a light source for directing light rays onto the film, wherein the light rays enter the film via the ridges, are reflected down through the film by total internal reflection, pass through the display, are reflected by the reflector, pass back through the display, and exit the film, whereby the film enhances the brightness of the display.

2. The system of claim 1, wherein the ridges are each comprised of a first face for accepting the light rays and a second face for reflecting the light rays down toward the display by total internal reflection, and wherein neighboring ridges are separated by a third face parallel to the smooth face of the film.

3. The system of claim 1, wherein the ridges are each comprised of a first face for accepting the light rays and a second face for reflecting the light rays down toward the display by total internal reflection, and wherein neighboring ridges are adjacent each other.

4. The system of claim 1, wherein the light source is comprised of a light tube and a reflector.

5. A front-lit liquid crystal display, comprising:

a liquid crystal display having front and back major surfaces and a plurality of pixels therebetween;

a transparent film having two major opposing surfaces, one smooth and the other having a plurality of parallel ridges, the ridges having a height within the range of from about 5 μm to 20 μm, the distance between neighboring ridge peaks being within the range of from about 10 to 20 times as great as the height of the ridges, the ridges having a pitch of at least one ridge per pixel, wherein the smooth surface is adjacent the front surface of the display;

a reflector provided adjacent the back surface of the display; and a light source for directing light rays onto the film, wherein the light rays enter the film via the ridges, are reflected down through the film by total internal reflection, pass through the display, are reflected by the reflector, pass back through the display, and exit the film, whereby the film enhances the brightness of the display.

6. A front-lit display system, comprising:

a display having front and back major surfaces;

a transparent film having two major opposing surfaces, one smooth and the other having a plurality of parallel ridges, wherein the smooth surface is adjacent the front surface of the display;

a reflector provided adjacent the back surface of the display; and a light source for directing light rays onto the film, wherein the light rays enter the film via the ridges, are reflected down through the film by total internal reflection, pass through the display, are reflected by the reflector, pass back through the display, and exit the film, whereby the film enhances the brightness of the display;

wherein the ridges are each comprised of a first face for accepting the light rays and a second face for reflecting the light rays down toward the display by total internal reflection, neighboring ridges being separated by a third face parallel to the smooth face of the film, and wherein the first face of each ridge forms an angle $\alpha$ within the range of from about 70° to 90° with respect to the smooth surface of the film and the second face of each ridge forms an angle $\beta$ within the range of from about 40° to 50° with respect to the smooth surface of the film.

7. A front-lit display system, comprising:

a display having front and back major surfaces;

a transparent film having two major opposing surfaces, one smooth and the other having a plurality of parallel ridges, wherein the smooth surface is adjacent the front surface of the display; a reflector provided adjacent the back surface of the display; and a light source for directing light rays onto the film, wherein the light rays enter the film via the ridges, are reflected down through the film by total internal reflection, pass through the display, are reflected by the reflector, pass back through the display, and exit the film, whereby the film enhances the brightness of the display;

wherein the ridges are each comprised of a first face for accepting the light rays and a second face for reflecting the light rays down toward the display by total internal reflection, neighboring ridges being adjacent each other, and wherein the first face of each ridge forms an angle $\alpha$ within the range of from about 5° to 20° with respect to the smooth surface of the film and the second face of each ridge forms an angle $\beta$ within the range of from about 60° to 90° with respect to the smooth surface of the film.

8. The system of claim 7, wherein the distance between adjacent peaks of the ridges is preferably within the range of from about 3 to 10 times greater than the heights of the ridges.

9. A front-lit display system, comprising:

a display having front and back major surfaces;

a transparent film having two major opposing surfaces, one smooth and the other having a plurality of parallel ridges, wherein the smooth surface is adjacent the front surface of the display;

a reflector provided adjacent the back surface of the display; and a light source for directing light rays onto the film, wherein the light rays enter the film via the ridges, are reflected down through the film by total internal reflection, pass through the display, are reflected by the reflector, pass back through the display, and exit the film, whereby the film enhances the brightness of the display;

wherein the ridges are each comprised of a first face for accepting the light rays and a second face for reflecting the light rays by total internal reflection, and wherein neighboring ridges are separated by a third face which is inclined at an angle within the range of from about 1° to 3° with respect to the smooth surface of the film so that the third face is angled toward the light source.

10. The system of claim 9, wherein the first face of each ridge forms an angle $\alpha$ within the range of from about 70° to 90° with respect to the smooth surface of the film, and wherein the second face of each ridge forms an, angle $\beta$ within the range of from about 40° to 50° with respect to the smooth surface of the film.

11. A front-lit display system, comprising:

a display having front and back major surfaces;

a transparent film having two major opposing surfaces, one smooth and the other having a plurality of parallel ridges, wherein the smooth surface is adjacent the front surface of the display;

a reflector provided adjacent the back surface of the display; and a light source for directing light rays onto the film, wherein the light rays enter the film via the ridges, are reflected down through the film by total internal reflection, pass through the display, are reflected by the reflector, pass back through the display, and exit the film, whereby the film enhances the brightness of the display, wherein the film has a plurality of parallel grooves therein parallel to the ridges, wherein a groove is provided adjacent each ridge on the side of the ridge opposite the light source.

12. The system of claim 11, wherein the grooves are at least ⅕ as deep as the ridges are high.

13. A front-lit display system, comprising:

a display having front and back major surfaces;

a transparent film having two major opposing surfaces, one smooth and the other having a plurality of parallel ridges, wherein the smooth surface is adjacent the front surface of the display, wherein the ridges are within the range of from about 5 µm to 20 µm high and the distance between neighboring ridge peaks is within the range of from about 10 to 20 times as great as the heights of the ridges;

a reflector provided adjacent the back surface of the display; and a light source for directing light rays onto the film, wherein the light rays enter the film via the ridges, are reflected down through the film by total internal reflection, pass through the display, are reflected by the reflector, pass back through the display, and exit the film, whereby the film enhances the brightness of the display.

14. A front-lit display system, comprising:

a display having front and back major surfaces;

a transparent film having two major opposing surfaces, one smooth and the other having a plurality of parallel ridges, wherein the smooth surface is adjacent the front surface of the display;

a reflector provided adjacent the back surface of the display; and a light source for directing light rays onto the film, the light source comprising a point light source and a light pipe, parallel to the ridges, having a plurality of notches on the side of the pipe opposite the display, wherein light rays enter the film via the ridges, are reflected down through the film by total internal reflection, pass through the display, are reflected by the reflector, pass back through the display, and exit the film, whereby the film enhances the brightness of the display.

15. The system of claim 14, wherein the point light source is a light emitting diode.

16. The system of claim 14, wherein the light pipe has a rectangular cross-section.

17. A front-lit display system, comprising:

a display having front and back major surfaces;

a transparent film having two major opposing surfaces, one smooth and the other having a plurality of parallel ridges, wherein the smooth surface is adjacent the front surface of the display;

a reflector provided adjacent the back surface of the display; and a light source for directing light rays onto the film, the light source comprising a point light source and a light pipe, parallel to the ridges, the light pipe decreasing in thickness along its length from the end nearer the point light source, the thickness being decreased by a plurality of steps provided in the side of the pipe opposite the display, wherein the light rays enter the film via the ridges, are reflected down through the film by total internal reflection, pass through the display, are reflected by the reflector, pass back through the display, and exit the film, whereby the film enhances the brightness of the display.

18. A front-lit display system, comprising:

a display having front and back major surfaces;

a transparent film having two major opposing surfaces, one smooth and the other having a plurality of parallel ridges, wherein the smooth surface is adjacent the front surface of the display;

a reflector provided adjacent the back surface of the display; and a light source for directing light rays onto the film at an angle $\gamma$ of less than 5° with respect to the smooth surface of the film, wherein the light rays enter the film via the ridges, are reflected down through the film by total internal reflection, pass through the display, are reflected by the reflector, pass back through the display, and exit the film, whereby the film enhances the brightness of the display.

19. The system of claim 18, wherein the angle $\gamma$ is about 2°.

20. A front-lit display system, comprising:

a display having front and back major surfaces;

a transparent film having two major opposing surfaces, one smooth and the other having a plurality of parallel ridges, wherein the smooth surface is adjacent the front surface of the display;

a reflector provided adjacent the back surface of the display;

a first light source for directing light rays onto the film, wherein the light rays enter the film via the ridges, are reflected down through the film by total internal reflection, pass through the display, are reflected by the reflector, pass back through the display, and exit the film, whereby the film enhances the brightness of the display; and a second light source, similar to the first light source, provided on an end of the display opposite from the first light source, for directing light rays onto the film, wherein a first face of each ridge forms an angle $\alpha$ with respect to the smooth surface of the film and second face of each ridge forms an angle $\beta$ with respect to the smooth surface of the film, wherein $\alpha=\beta$.

* * * * *